United States Patent [19]

Tanaka

[11] 4,165,844
[45] Aug. 28, 1979

[54] DUAL TENSION SAFETY BELT

[75] Inventor: Akira Tanaka, Northridge, Calif.

[73] Assignee: American Safety Equipment Corporation, Encino, Calif.

[21] Appl. No.: 850,843

[22] Filed: Nov. 11, 1977

[51] Int. Cl.$^2$ ................. A62B 35/00; B65H 75/48
[52] U.S. Cl. ........................ 242/107; 242/107.4 R
[58] Field of Search ....................... 242/107–107.7; 297/388; 280/744–747

[56] References Cited

U.S. PATENT DOCUMENTS

| 3,984,063 | 10/1976 | Knieriemen | 242/107 |
|---|---|---|---|
| 4,026,494 | 5/1977 | Tanaka | 242/107 |

Primary Examiner—Harvey C. Hornsby
Assistant Examiner—John M. Jillions
Attorney, Agent, or Firm—Poms, Smith, Lande & Rose

[57] ABSTRACT

A dual tension safety belt retractor including a belt storage reel rotatably mounted to a retractor frame by a reel shaft having a shaft end protruding from a frame side wall has dual tension retraction mechanism mounted to the frame side wall to apply either of two rewind biases upon said reel via said shaft in response to belt winding and unwinding movements of predetermined manner in which the retraction mechanism has a pawl carrier rotatably mounted on the reel shaft end with a pawl pivotally mounted on the pawl carrier for rotation with and relative to the carrier, providing a power spring receiving chamber, a power spring for biasing the carrier in a given direction, ratchet means to be engaged by the pawl on the pawl carrier, means for biasing the pawl carrier toward the ratchet means teeth, pawl silencer ring means for normally holding the pawl out of engagement with the ratchet means teeth and allowing such engagement on a slight retractive movement of the reel, cam means for selectively engaging the pawl to move it from a ratchet means engaging position, a lower tension spring connected between the pawl carrier and cam means for biasing the reel at a lower value and cam follower means on the pawl for being engaged by the cam means during reel winding movement under the influence of the lower tension spring during a low tension mode of operation of the mechanism to pivot the pawl and thereby end such low tension mode.

9 Claims, 14 Drawing Figures

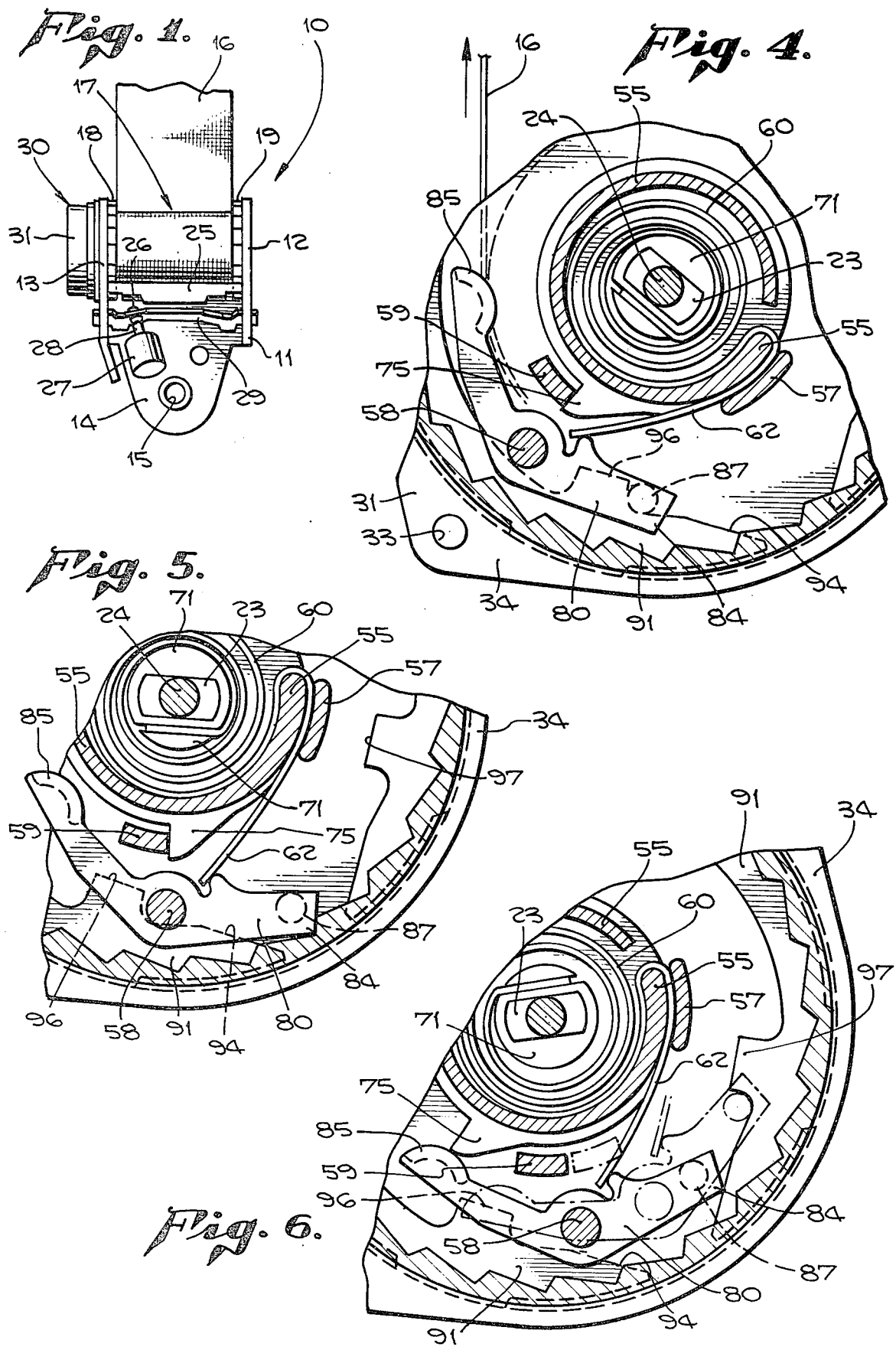

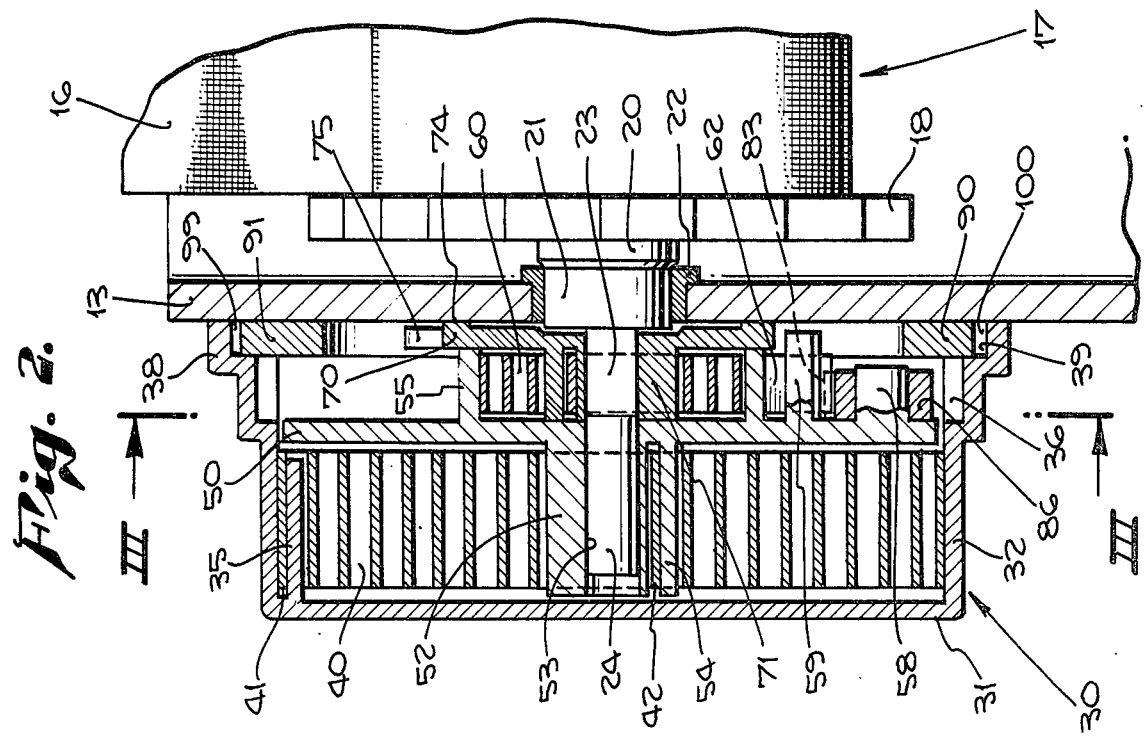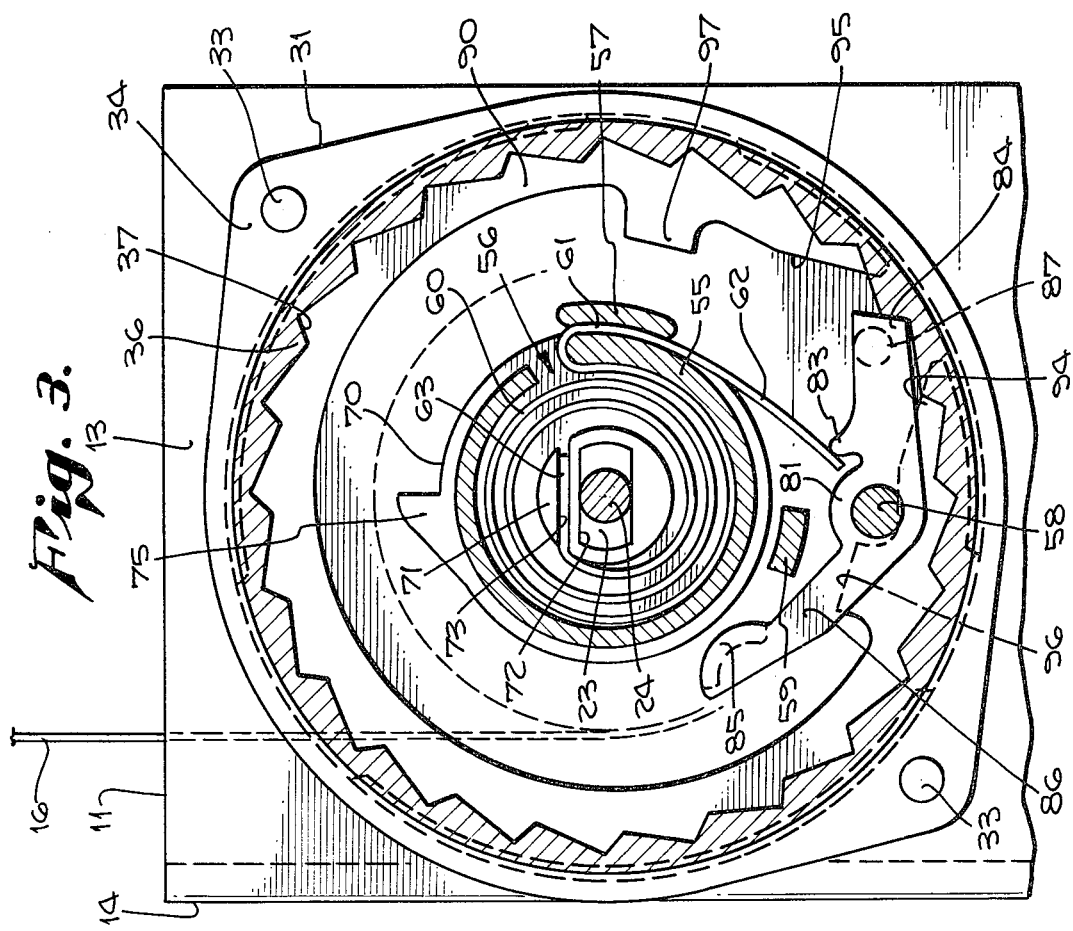

4,165,844

DUAL TENSION SAFETY BELT

BACKGROUND OF THE INVENTION

The present invention relates to retraction mechanism for emergency locking safety belt retractors and more specifically to retraction mechanisms capable of selectively applying either of two different magnitudes of reel rewind bias to the safety belt retractor reel in response to rotational movement of the reel normally encountered during use of safety belt and harness straps employed with such retractors for holding vehicle occupants in their seats during emergency conditions.

Various types of dual tension safety belt retractor mechanisms have been employed heretofore for selectively applying a main spring rewind bias to the safety belt reel during normal belt protraction and retraction relative to the retractor and for applying a lower tension to the belt while the seat belt is in use about a vehicle occupant user. As is presently known, it is desirable to reduce the tension in a chest belt of a safety harness for automotive passenger restraint when the belt is in use with an emergency locking type of retractor wherein the belt is prevented from protraction, reel unwinding movement, only when an emergency condition occurs. Since the belt is not prevented from an unwinding movement during normal wearing conditions, it is preferred that a rewind bias be continuously applied to the retractor reel in order to prevent buildup of slackness in the safety belt relative to the vehicle occupant employing such safety belt. Moreover, as is also known in the art, it is preferred that when the belt is in use, such rewind bias to prevent slackness in the belt be of a lower value than that normally applied for rewinding the belt onto the retractor reel when the belt is taken out of use. Exemplary of such prior art dual tension retraction mechanisms are those disclosed in copending applications of Charles J. Ulrich, Ser. No. 706,772, filed July 19, 1976, entitled, "Safety Belt Retractor with Dual Tension Retraction Means," the application of Akira Tanaka and Charles Ulrich, Ser. No. 751,753, filed Dec. 17, 1976 now U.S. Pat. No. 4,081,153 entitled "Safety Belt Tensioning and Rewinding Retractor," the application of Akira Tanaka, Ser. No. 701,504, filed July 1, 1976 and entitled "Safety Belt Retractor with Conjugate Return Spring Means," and application of Akira Tanaka, Ser. No. 773,356, filed Oct. 18, 1976 and entitled "Friction Clutch Operated Dual Tension Safety Retraction Means," each of said applications being assigned to the assignee of the within application. While these earlier versions of dual tension retractors are believed to be commercially practicable and satisfactory solutions to a dual tensioning mechanism for emergency locking safety belt retractors, it has been recognized that it would be desirable to design a more simply operable retractor capable of being manufactured at a lower cost and being of a lesser bulk than earlier versions.

SUMMARY OF THE INVENTION

It is therefore a primary object of the present invention to disclose and provide a dual tension retraction mechanism of more compact configuration which is capable of being manufactured at a lower cost in a more facile manner than heretofore known dual tension retraction mechanisms which is suitable for use in association with emergency locking safety belt retractors for vehicles wherein the associated safety belt is normally free to be protracted and retracted relative to the retractor.

It is the still further object of the present invention to disclose and provide a dual tension retraction mechanism as in the foregoing object wherein the lower tension mode of operation for the mechanism is provided with an extended zone of operation of more than one full retractive rotation of the reel under the bias of the low tension spring before the main bias of the power spring is reapplied.

Generally stated, the improvement in dual tension retraction mechanism of the present invention includes the provision of a pawl carrier rotatably mounted on the retractor reel shaft end within an associated housing providing a power spring receiving chamber in which a power spring is disposed in operable association with the housing and pawl carrier to normally bias the pawl carrier in a direction to cause rewinding of the retractor reel, the pawl carrier acting through engagement with a shaft mounted cam for biasing the reel, pawl means pivotally mounted on the carrier for rotation relative to and with the carrier and selectively engageable with ratchet means formed about an interior surface of the housing, means for biasing the pawl relative to the carrier toward the ratchet means, pawl silencer ring means mounted to the housing for normally holding the pawl out of engagement with the ratchet means subject to allowing such engagement on a slight rewind movement of the reel following a protraction of the safety belt to position of use, cam means mounted to the reel shaft for cooperation as aforesaid with the pawl carrier to impart the bias of the main spring to the reel shaft and for engaging and causing pawl release from the ratchet means at the end of a low tension mode of operation, a lower tension spring connected between the pawl carrier and aforesaid cam means for biasing the reel in a belt rewind direction when the pawl carrier is held stationary by engagement of the pawl and ratchet means, blocking out the bias of the main power spring, and cam follower means on the pawl for being engaged by the shaft cam in response to belt winding movement of the reel of a predetermined amount. In an alternative exemplary embodiment, the range of reel winding rotation during the low tension mode is extended to approximately one and three quarters turns through the provision of a second cam, interposed between the aforementioned shaft cam and pawl carrier to require a greater rewind rotation of the shaft cam before the second cam engages and causes release of the pawl relative to the associated ratchet means.

The foregoing objects and various advantages of the present improvement in dual tension retraction mechanism for emergency locking retractors will become apparent to those skilled in the art from a consideration of the following detailed description of two exemplary embodiments of such mechanisms in accordance with the present invention. Reference will be made to the appended sheets of drawings which will be described first briefly.

BRIEF DESCRIPTION OF THE DRAWING

FIG. 1 is a top view of an exemplary emergency locking safety belt retractor in which the present invention in dual tension safety belt reel retraction mechanism may be employed;

FIG. 2 is a section view of a first exemplary embodiment of dual tension retraction mechanism for a safety belt storage reel of an emergency locking retractor in accordance with the present invention;

FIG. 3 is a side section view of the exemplary embodiment of dual tension retraction mechanism of FIG. 2 taken therein along the plane III—III showing the mechanism in a "low tension" mode;

FIG. 4 is a view as in FIG. 3 showing the mechanism during belt unwinding toward a position of use;

FIG. 5 is a view as in FIG. 4 showing the mechanism after a slight retraction of the safety belt following a protraction as illustrated in FIG. 4;

FIG. 6 is a view as in FIGS. 3 through 5 showing the mechanism at the end of a "low tension" mode and the main power spring being reapplied;

DETAILED DESCRIPTION OF A FIRST EXEMPLARY EMBODIMENT

Figure 7:
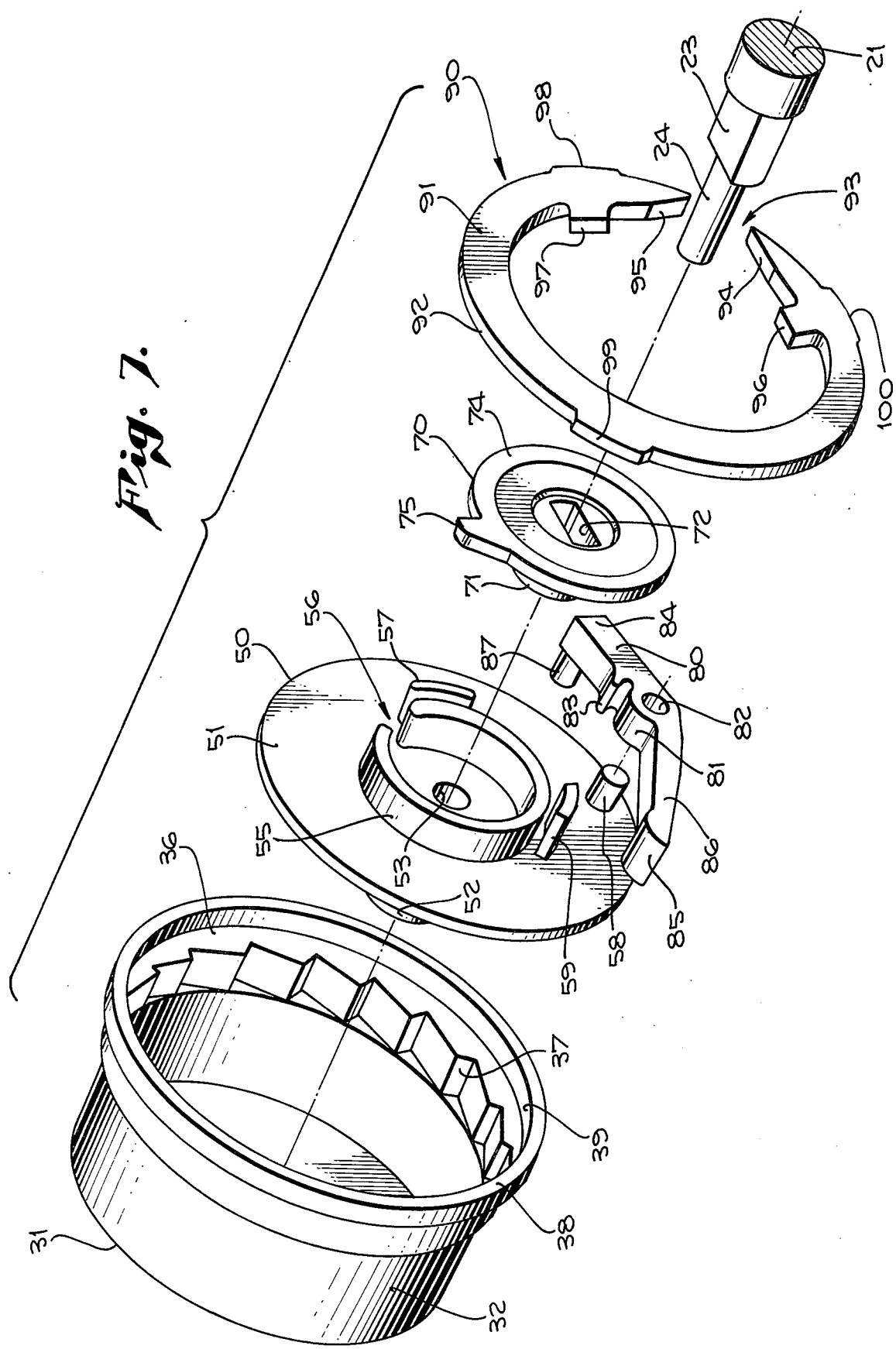
FIG. 7 is an exploded perspective view of components of the exemplary embodiment in dual tension retraction mechanism of FIGS. 1 through 6 with the exception of the springs.

Referring initially to FIG. 1, an exemplary embodiment of emergency locking safety belt retractor is illustrated with which the present invention in dual tension safety belt retraction mechanism may be suitably employed. As seen in FIG. 1, an emergency locking vehicle inertia responsive retractor is illustrated generally at 10 and includes a U-shaped retractor frame having side walls 12 and 13 formed integrally of base 14 which is provided with a mounting aperture 15 for mounting the retractor in a suitable location in a vehicle for retracting and anchoring safety belt or harness webbing 16 on the associated reel indicated generally at 17. As seen in FIGS. 1 and 2, the safety belt reel, indicated generally at 17, includes a pair of ratchet wheels 18 and 19 mounted on a reel shaft 20 which is journaled by bearing portions at opposite ends, as bearing portion 21 in FIG. 2, in bushings mounted to the retractor side walls, as bushing 22 is mounted to side wall 13 in FIG. 2. As will be discussed hereinafter, shaft 20 is further provided with a rectangular end portion 23 and a still further extension portion 24 of cylindrical configuration for cooperating with components of the dual tension retraction mechanism of the present exemplary embodiment as explained hereinafter.

The exemplary retractor, indicated generally at 10, in FIG. 1 is of the vehicle inertia sensitive type wherein a lock bar 25, pivotally mounted between side walls 12 and 13, is tiltable into locking engagement with ratchet wheels 18 and 19 in now conventional manner in response to actuation by actuator head 26 of pendulum 27 suspended by stem 28 and head 26 from brace 29 fixed between side walls 12 and 13. As is now known in the art, in the event of a sudden change in inertia of the vehicle, as in the event of a sudden deceleration of the vehicle, pendulum 27 will swing to cause its associated actuator head 26 to tilt lock bar 25 into locking engagement with ratchet wheels 18 and 19. However, during normal vehicle operation, the safety belt reel, indicated generally at 17, is free to allow belt winding and unwinding under the bias of the associated retraction mechanism. This allows occupant movement with the safety belt or harness in use with, as particularly contemplated within the present invention, a low tension mode of operation for belt 16 during use of belt 16 as part of a chest belt or harness as is also presently known in the art.

Referring now to FIGS. 2 through 7, the improvement in dual tension safety belt retraction mechanism in accordance with the present invention will be described in detail. The first exemplary retraction mechanism is illustrated generally at 30 and includes a housing 31 having a cylindrical cup body 32 adapted to be fixed by suitable fasteners 33, as screws or bolts, securing the housing flange 34 to the retractor side wall 13. As seen in FIG. 2, and in exploded relation, except for the springs, in FIG. 7, housing 31 encloses the major components of the exemplary dual tension retraction mechanism including the power spring 40, pawl carrier 50, low tension spring 60, reel shaft operated cam 70, pawl 80 and pawl silencer ring 90, as explained more fully hereinafter.

Main power spring 40 is preferably a constant tension coil spring of presently known design in the industry, and is mounted in a chamber formed within housing 31 by the housing and pawl carrier 50 with a spring outer end 41 held fixed relative to the housing by being fitted into housing slot 35 and with the spring inner end 42 entrained in slot 54 of pawl carrier 50.

Pawl carrier 50 in the exemplary embodiment comprises a disk body 51 having an integrally formed hub 52 rotatably mounted on cylindrical shaft end 24 received within carrier hub bore 53. As best seen in FIG. 7, pawl carrier 50 is provided with a cylindrical boss 55 providing an annular cavity to receive the low tension spring 60 with an outer spring end 61 passing through the opening, indicated generally at 56, in the boss side wall (as seen in FIG. 3) and being entrained between the boss side wall adjacent such opening and the spring retaining wall 57. An extension 62 of the spring outer end may be used in the exemplary embodiment for biasing pawl 80 as discussed hereinafter. The inner end 63 of low tension spring 60 is secured via slot 73 to the reel shaft operated cam 70.

Cam 70, as seen in FIGS. 2, 3 and 7 in the exemplary embodiment is mounted by an integrally formed hub 71 to the rectangular shaft end 23 of reel shaft 20 with shaft end 23 being received within a rectangular bore 72 of cam 70. The cam 70 and reel shaft 20 thus rotate in unison with the cam 70 being further provided with a bearing ring surface 74 riding against the retractor side wall 13. As explained more fully hereinafter, cam 70 is provided with a cam lobe 75 which cooperates with the pawl 80 to terminate a low tension mode of operation for the retractor mechanism in response to a predetermined amount of reel rotation in a belt winding direction when the mechanism is in a low tension mode.

The bias of the main power spring 40, as explained more fully hereinafter, is exerted upon reel shaft 20 through the pawl carrier 50 and thus can be blocked by holding pawl carrier 50 against rotation within housing 31. In the exemplary embodiment, such locking of the main power spring 40 is accomplished through engagement of pawl 80 with ratchet means 36 provided on the interior of housing 31. As best seen in FIGS. 2, 3 and 7, and as contemplated within the invention of the present disclosure, the ratchet means 36 is formed integrally of the housing 31 with teeth 37 facing inwardly of the housing.

Pawl 80 is journaled by its hub 81 on pawl carrier pin 58 received within pawl bore 82. A spring abutment 83 is provided upon the pawl to be engaged by the free end 62 of the low tension spring in a manner, as illustrated in FIG. 3, to bias the pawl tooth 84 toward locking engagement with any one of the teeth 37 of housing ratchet means 36. Pawl 80 is thus pivotally mounted for rotative movement relative to pawl carrier 50 and for rotation with pawl carrier 50 about reel shaft end extension 24 with the surrounding housing means presenting the ratchet means 36 about an inner annular portion of the housing and radially outwardly of the rotative path of travel of the pawl 80.

Pawl silencer ring means, indicated generally at 90, are provided in the exemplary embodiment to normally maintain tooth 84 of pawl 80 out of engagement with teeth 37 of ratchet means 36 so that the mechanism normally operates silently, i.e., without the noise attendant a ratcheting of the pawl 80 over the ratchet means teeth. As explained hereinafter, the silencing ring means, indicated generally at 90, further facilitates maintaining the pawl in an unlocked condition during rewinding movement of the reel. As best seen in FIG. 7, the exemplary embodiment of pawl silencer ring means includes a split ring body 91 having a cylindrical outer surface 92 interrupted by the opening, indicated generally at 93, in the split ring. Ring 91 is preferably resiliently formed in a manner to place its bearing lobes 98, 99 and 100 in sliding engagement within the race 39 formed within rim 38 of the housing so that ring 91 may be easily rotated in either direction under influence of the pawl and pawl carrier as subsequently described. Pawl 80 is provided with a drive pin 87 which is adapted to cam slopes 94 and 95, and engage stop shoulders 96 and 97, respectively, to hold the pawl in unlocked condition and drive the ring therewith about the interior race 39 of housing 31 during operation of the mechanism as will now be described.

The condition of the exemplary embodiment of dual tension retraction mechanism of the present embodiment during belt unwinding is shown in FIG. 4 wherein protraction or unwinding of belt 16 causes reel shaft 20 to rotate its shaft end 23 clockwise driving shaft cam lobe 75 into engagement with abutment 59 on pawl carrier 50, as seen in FIG. 4, to cause clockwise rotation of pawl carrier 50 with shaft 20.

On a slight rewinding movement of safety belt 16, on the order of that normally accompanying buckling of a safety belt into a position of use by the occupant, and the associated counterclockwise rotation of pawl carrier 50 under the influence of the main power spring 40 from the position of FIG. 4 to that of FIG. 5, the silencer ring 91 remaining stationary, pawl 80 is moved to the position of FIG. 5 with drive pin 87 leaving shoulder 96 and cam slope 94 to allow pawl tooth 84 to engage with one of the teeth 37 of ratchet means 36. Pawl carrier 50 is thus prevented from further counterclockwise rotation under the urging of power spring 40 and the bias of spring 40 is thus blocked from acting upon reel shaft 20. The retraction mechanism is then in a low tension mode during further reel winding movement under the tension of the low tension spring 60 acting between the then stationary pawl carrier 50 and shaft mounted cam 70 as seen in FIG. 3. Continued winding movement of the reel, indicated generally at 17, beyond the position illustrated in FIG. 3 toward that illustrated in FIG. 6, slightly less than one full rewind revolution of the reel, shaft cam lobe 75 engages cam follower 85 provided on cam arm 86 to pivot to cam 80 out of engagement with ratchet means 36 as seen in solid line in FIG. 6. Release of cam 80 allows reapplication of the bias of main power spring 40 upon pawl carrier 50, the latter then turning counterclockwise moving pawl drive pin 87 up silencer ring ramp 95 into engagement with ring shoulder 97, the pawl carrier 50 and ring 90 revolving counterclockwise with carrier abutment 59 coming around into engagement with the vertical face of cam lobe 75 during continued rewinding of belt 16 under the urging of the main bias of the retraction mechanism. Subsequent protraction returns the mechanism to the condition of FIG. 4 with the operation as thus far described then repeating during manipulation of belt 16 to a position of use.

DETAILED DESCRIPTION OF SECOND EXEMPLARY EMBODIMENT

Figure 9:
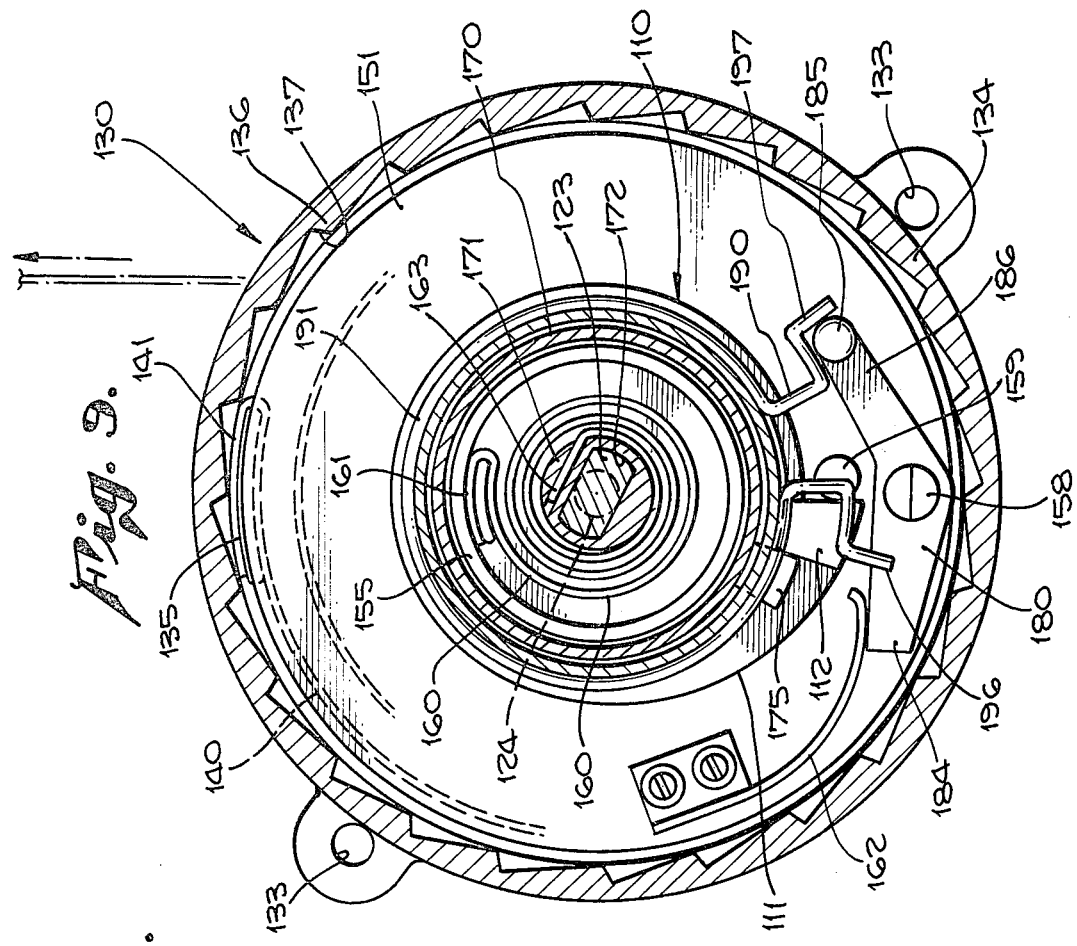
FIG. 9 is a section view of the retraction mechanism of FIG. 8 taken therein along the plane IX—IX showing the mechanism during safety belt unwinding toward a position of use.
Figure 8:
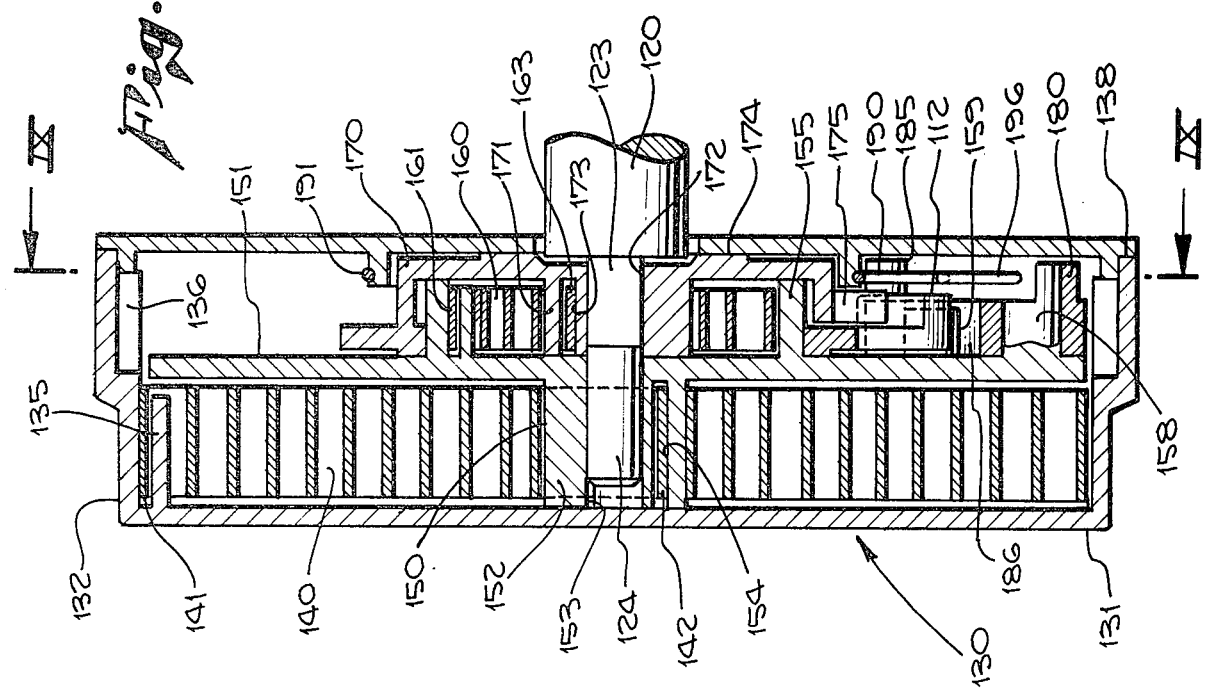
FIG. 8 is a section view of a second exemplary embodiment in dual tension safety belt reel retraction mechanism in accordance with the present invention.

A second preferred exemplary embodiment of dual tension retraction mechanism, in accordance with the present invention, is illustrated in FIGS. 8 through 14 and will now be described in detail. In most respects, the construction and mode of operation of this second embodiment follows that of the former and is suitable for use with a vehicle inertia sensitive emergency locking retractor as illustrated in FIG. 1. Referring initially to FIGS. 8 and 9, the exemplary retraction mechanism is indicated generally at 130 and includes a housing 131 having a cylindrical cup portion 132 enclosing power spring 140. Housing 131, as before, may be secured by suitable fasteners 133 associated with housing flange 134 to the side wall of a safety belt retractor, as side wall 13 of the retractor indicated generally at 10 in FIG. 1.

Main power spring 140 is mounted within housing 131 with an outer spring end 141 secured in housing slot 135 and an inner end 142 secured in slot 154 of pawl carrier 150.

Pawl carrier 150, as in the manner of the prior embodiment, includes a disk body 151 forming a chamber within housing 131 in which the power spring 140 is enclosed. Carrier body 151 includes a hub portion 152 rotatably mounted about the cylindrical shaft extension 124 received within the cylindrical bore 153 within hub 152. Carrier 150 is further provided with a cylindrical boss 155 which cooperates with reel shaft mounted cam 170 to enclose and mount the low tension spring 160.

Low tension spring 160 has its outer end 161 held in carrier slot 156 and its inner end 163 secured in shaft cam slot 173, the low tension spring thus being interposed between pawl carrier 150 and cam 170. The cam 170 includes a bearing ring 174 riding against a seal plate 176 which is mounted to housing rim 138 as seen in FIG. 8.

In the present exemplary embodiment, an extended low tension mode of operation is provided through the inclusion of a second cam disk 110 rotatably mounted about carrier boss 155 which operates, in a manner hereinafter explained, between shaft cam 170 and pawl carrier stop 159 to provide an additional full rotation for reel shaft 120 in the belt winding direction during the low tension mode. Second cam member 110 is provided with a pawl engaging cam surface 111 and an abutment head 112 which abuts between shaft cam lobe 175 and carrier pin 159 during operation of the mechanism as subsequently described.

The pawl, indicated generally at 180, in the present embodiment is journaled by its hub 181 on carrier pin 158 received within pawl bore 182. In the present embodiment, pawl tooth 184 is biased by spring 162 secured to the pawl carrier disk 151 toward engagement with teeth 137 of the ratchet means 136 formed, in the manner of the prior embodiment, on the interior annular surface of the surrounding housing 131. Pawl 180 is further provided with a cam follower 185 on the end of cam arm 186 which cooperates with camming surface 111 at the end of a low tension mode of operation and with the spring wire end shoulders 196 and 197 between low tension modes during the operation of the retraction mechanism of the present embodiment as will now be described.

During protraction of the webbing from the retractor in a reel unwinding direction the retraction mechanism of the present embodiment assumes the position illustrated in FIG. 9 wherein counterclockwise rotation of shaft 120 rotates the shaft cam 170 counterclockwise via its mounting on shaft end 123 placing shaft cam lobe 175 in abuting, driving relation to the secondary cam head 112 which abuts pawl carrier stop 159 holding pawl drive pin 185 against spring wire shoulder 197 with pawl 180 in unlocked relation against the bias of spring 162 to cause concurrent rotation of the reel shaft 120, shaft cam 170 and pawl carrier 150 against the bias of the main power spring 140. When the webbing has been protracted to a position of use, a slight winding, retractive movement of the webbing allows a slight clockwise rotation of shaft cam 170 and pawl carrier 150 under the urging of spring 140 moving pawl 180 to the position of FIG. 10 wherein pawl drive pin 185 has been removed from the then stationary spring wire cam 191 and urged into locking engagement with ratchet means 136 under the urging of spring 162 causing clockwise pivoting movement of pawl 180 from the position of FIG. 9 to that of FIG. 10. The retraction mechanism is then in a low tension mode with pawl 180 holding pawl carrier 150 against rotation and thus blocking out the bias of the main power spring 140 from effecting reel rotation.

Figure 10:
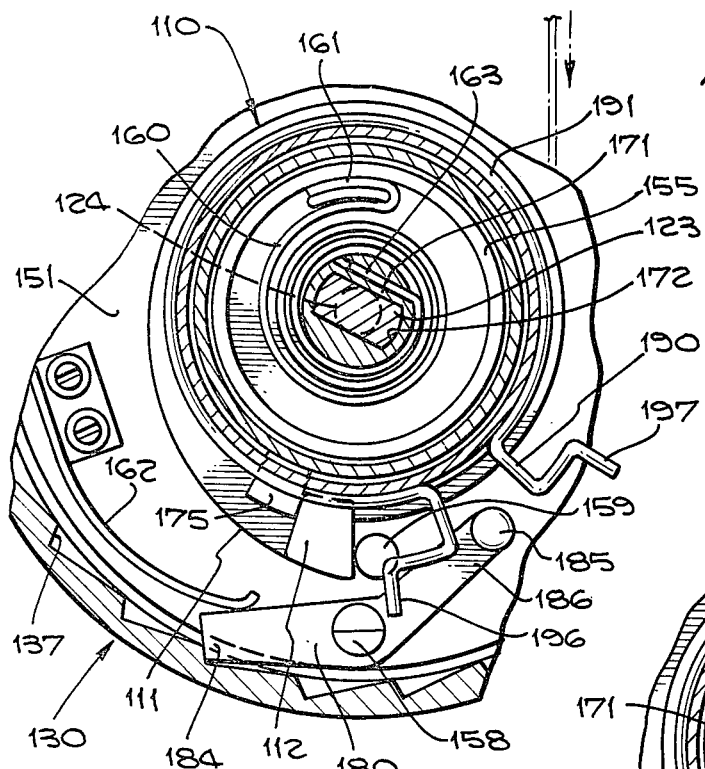
FIG. 10 is a view as in FIG. 9 showing the mechanism initiating a low tension mode in response to a slight safety belt winding movement following the unwinding condition of FIG. 9.
Figure 11:
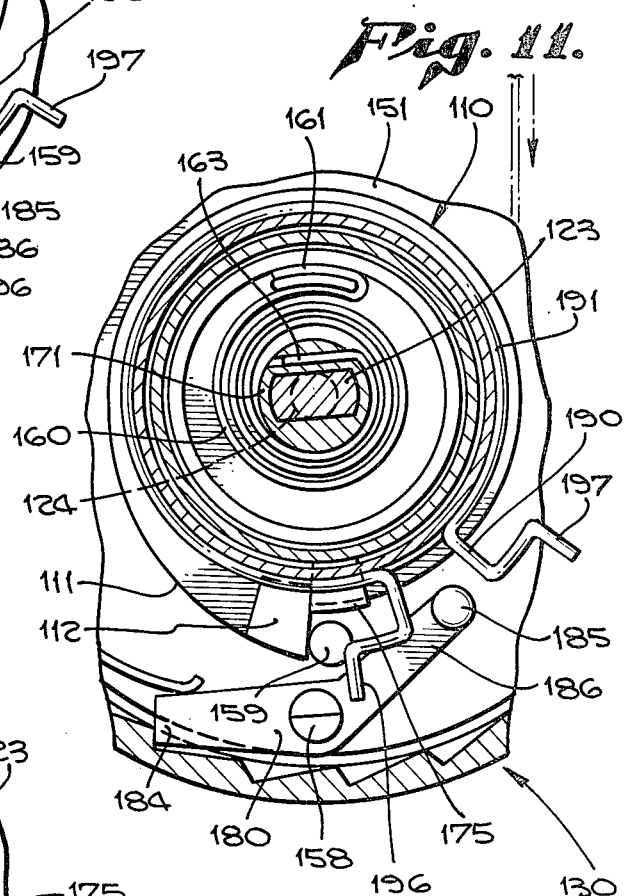
FIG. 11 is a view as in FIG. 10 showing the mechanism during a "low tension" mode following a first revolution of the safety belt reel while the reel is in the low tension mode.
Figure 12:
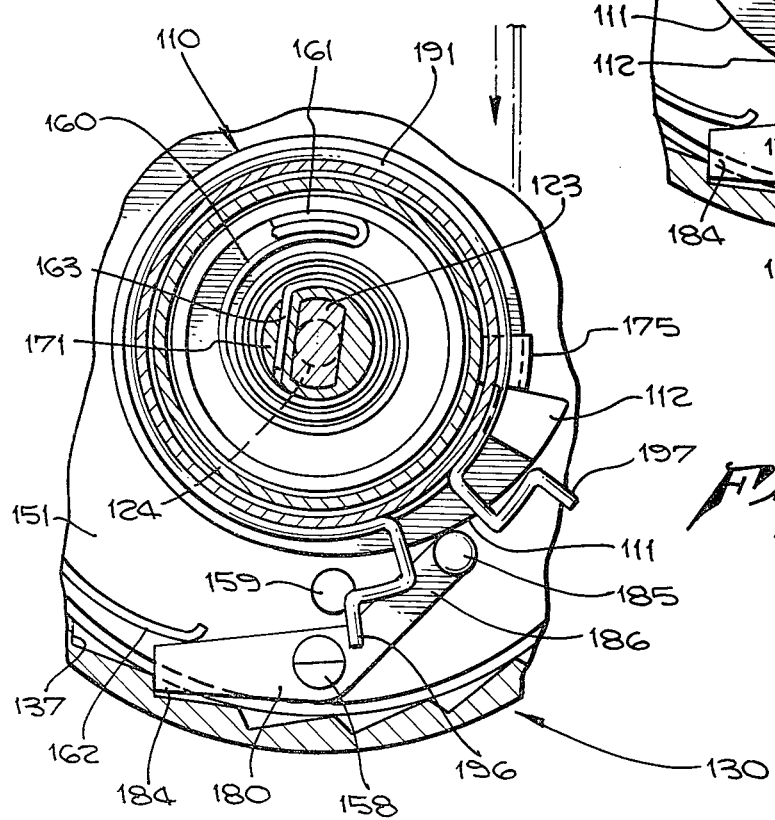
FIG. 12 is a view as in FIG. 11 showing the mechanism following a reel rotation of approximately one and three quarter turns in the low tension mode with the mechanism terminating the low tension mode and reapplying the bias of the main power spring.

When the retraction mechanism of the present embodiment is in the low tension mode as shown being initiated in FIG. 10, the low tension spring 160 continues to bias the reel in a rewind direction for a low tension reel rewinding travel of approximately one and three quarter turns of the reel from the position of FIG. 10 to the position of FIG. 12. During such winding rotation of the reel shaft 120, shaft cam 170 rotates clockwise approximately one full revolution bringing cam lobe 175 into engagement with an opposite side of second cam head 112 as seen in FIG. 11 whereupon continued clockwise rotation of shaft 120 and cam 170 carries secondary cam 110 also in a clockwise direction around to the position of FIG. 12. When the primary cam 170 and secondary cam 110 reach the position of FIG. 12, the camming surface 111 of cam 110 engages pawl drive pin 185 and cams pawl 180 out of locking engagement with ratchet means 136, as seen in phantom line in FIG. 13, ending the low tension mode of operation of the mechanism. It can be seen from the foregoing that the present embodiment thus has an extended low tension mode of operation with the seat belt being under the low tension bias of spring 160 for up to approximately one and three quarter turns of the reel after the low tension mode has been selected through a slight retraction of the retractor reel to the position of FIG. 10 following initial protraction as illustrated in FIG. 9.

Figure 13:
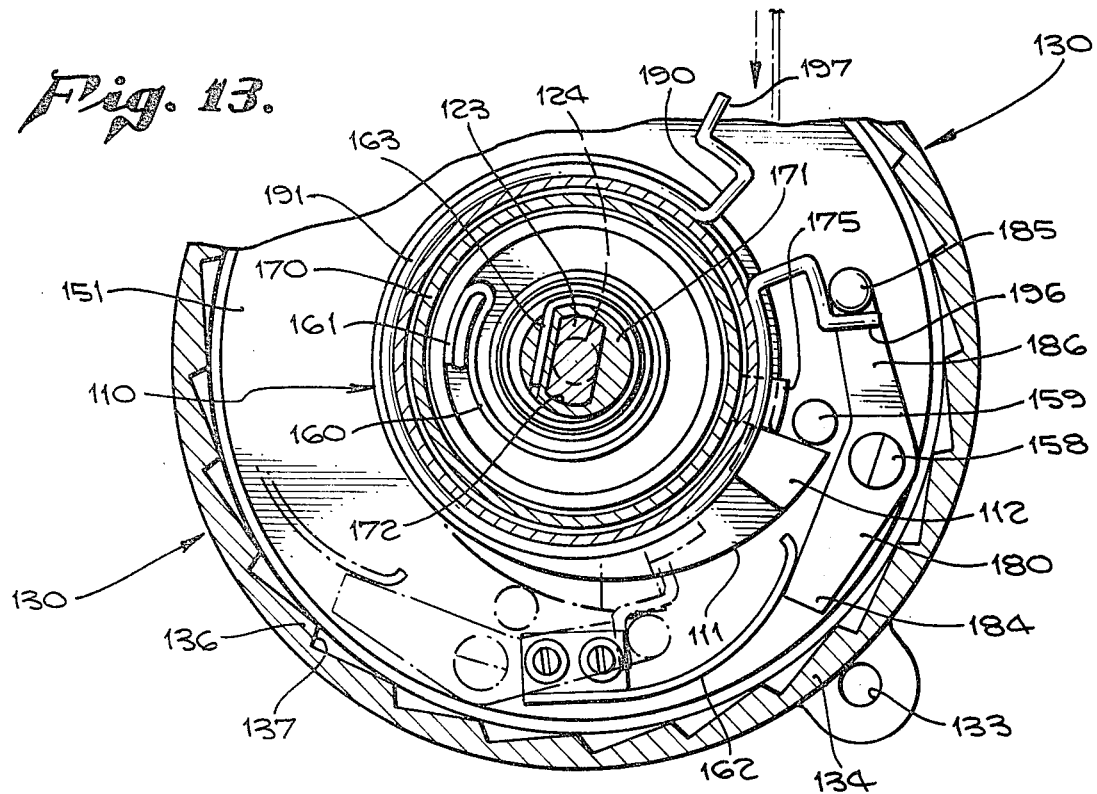
FIG. 13 is a view as in FIG. 12 showing the mechanism immediately after termination of the low tension mode in phantom line and after approximately three quarters of a reel turn thereafter in solid line with the reel being wound in a webbing winding direction under the bias of the main power spring.
Figure 14:
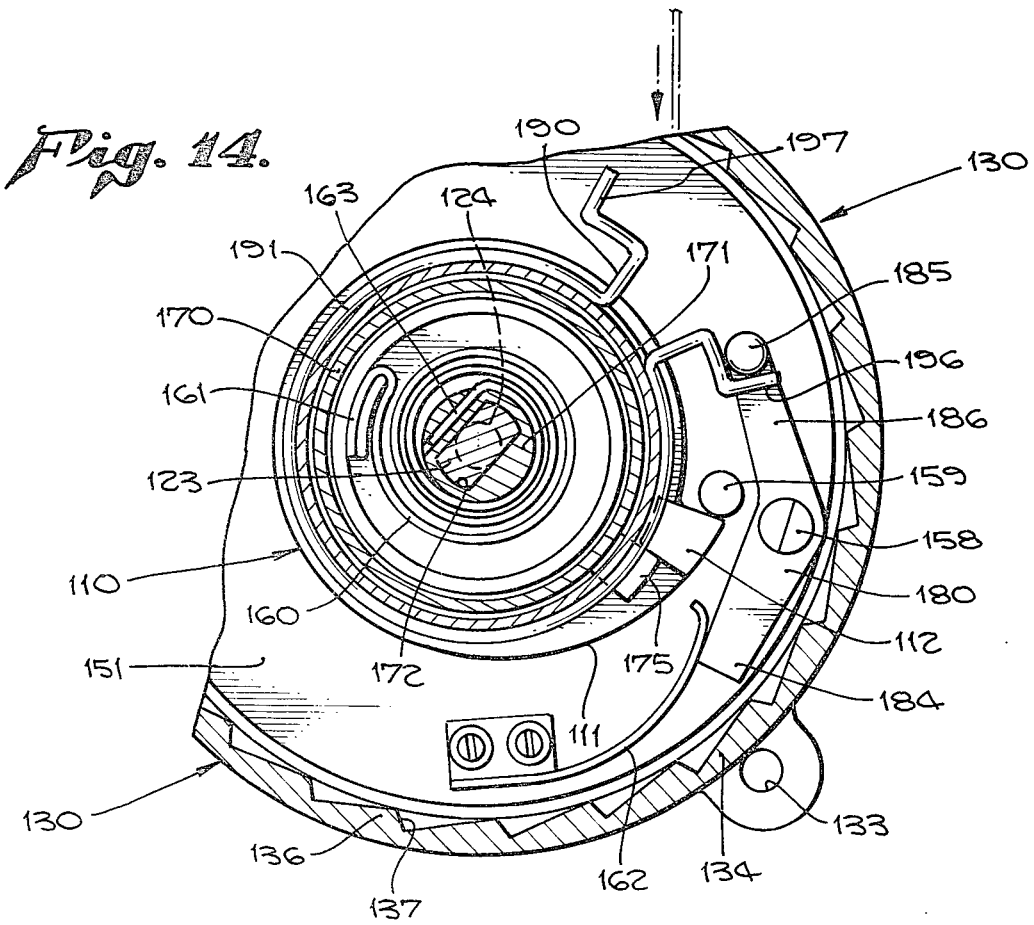
FIG. 14 is a view as in FIG. 13 showing the mechanism during webbing retraction following approximately one and three quarter reel turns in a webbing winding direction following termination of the low tension mode which the mechanism continues to assume during continued webbing winding thereafter.

On release of pawl 180 from the ratchet means 136 at the end of the low tension mode of operation, as seen in phantom line in FIG. 13, the bias of the main power spring 140 causes pawl carrier 150 to rotate clockwise in FIG. 13 moving carrier stop pin 159 around and into engagement with the vertical surface of second cam head 112, as seen in solid line in FIG. 13, with continued carrier rotation in the clockwise direction moving the secondary cam head 112 one full revolution in the clockwise direction from the position of FIG. 13 to that of FIG. 14 where head 112 abuts the opposite side of shaft cam lobe 175 and thus reapplies the bias of the main spring 140 through carrier 150 and shaft cam 170 to the reel shaft 120. During rewinding rotation of the mechanism as seen in FIG. 14, the pawl drive pin 185, cammed outwardly by camming surface 111, seats against shoulder 196 in the silencing spring wire means 190 as seen in FIG. 14 during full retraction of the safety belt. Subsequent protraction of the safety belt moves the exemplary retraction mechanism back to the condition of FIG. 9.

Having thus described to exemplary embodiments of dual tension retraction mechanism in accordance with the present invention, it should be understood by those skilled in the art that various modifications, adaptations and equivalent constructions may be made within the scope of the present invention which is defined by the following claims.

I claim:

1. In a dual tension safety belt retractor having a belt storage reel rotatably mounted to a retractor frame by a reel shaft with a shaft end protruding from a frame side wall to which a retraction mechanism is mounted to apply either of two rewind biases upon said reel via said shaft in response to belt winding and unwinding movement, the improvement in said retraction mechanism comprising the provision of:

a pawl carrier rotatably mounted on said shaft end and a pawl pivotally mounted on said carrier for rotation with and relative to said carrier;

housing means for enclosing said pawl carrier and providing a power spring receiving chamber therewith;

a power spring connected between said housing and pawl carrier for biasing said carrier in a given direction;

ratchet means provided about an inner annular portion of said housing means and radially outwardly of a rotative path of travel of said pawl on rotation of said carrier, said ratchet means presenting inwardly facing teeth to be engaged by said pawl;

means for biasing said pawl relative said carrier toward said teeth;

pawl silencer ring means for normally holding said pawl out of engagement with said teeth, said means being operable upon reel rotation in a rewind direction after an unwinding reel rotation to release said pawl into engagement with said teeth to thereby hold said carrier stationary relative said housing;

cam means driven by said shaft and stop means on said carrier for driving said carrier in a power spring winding direction on a belt unwinding movement of said reel shaft via said cam means engaging said stop means;

a lower tension spring connected between said carrier and cam means for biasing said shaft in a belt rewind direction when said carrier is held stationary by said pawl engaging said teeth; and cam follower means on said pawl for being engaged by said cam means on shaft rewind rotation under the influence of said lower tension spring of a predetermined amount, whereby said belt is under the bias of said power spring during normal belt winding and unwinding and is under a lower bias of said lower tension spring while said pawl is engaged with said ratchet provided within said housing.

2. The improvement as in claim 1 wherein:
said ratchet means is formed integrally of said housing.

3. The improvement as in claim 1 wherein:
said housing means is provided with an interior race and
said ring mean comprises a radially resilient ring mounted within said housing race.

4. The improvement as in claim 3 wherein:
said ring includes radially inwardly projecting stop shoulders for engagement with said pawl when in a released position relative said teeth whereby said ring revolves within said housing along with said pawl and pawl carrier.

5. The improvement as in claim 4 wherein:
said ring has race engaging lobes on its extension surface to reduce the surface contact between said ring and race.

6. The improvement as in claim 1 wherein:
said means for biasing said pawl comprises an end extension of said lower tension spring held inwardly of a free end to said carrier and engaging said pawl by said free end.

7. The improvement as in claim 1 wherein:
said cam means includes a first cam member fixed to said shaft and having a first cam lobe and a second cam member rotatably mounted relative to said shaft adjacent said first cam member and having a second cam lobe positioned to be engaged by said first cam lobe on relative rotation between said cam members and to engage said cam follower means when driven by said first cam lobe to said pawl.

8. A dual tension retraction mechanism for an emergency locking safety belt retractor having a belt storage reel rotatably mounted by a shaft to the retractor comprising:

a housing mounted to said retractor;

a power spring mounted within said housing by an outer spring end and having an inner end;

carrier means mounted for rotation relative said housing and having slot means for engaging said power spring inner end whereby said carrier means is biased by said power spring in a given direction;

pawl means movably mounted on said carrier means and ratchet means formed within said housing for locking said carrier means against rotation in said given direction when said pawl means engages said ratchet means;

pawl silencer ring means slidably mounted relative said housing for holding said pawl means out of engagement with said ratchet means during normal reel movement on protraction and retraction of a safety belt relative said reel and allowing said engagement on a slight rewinding movement of said reel after protraction of the belt to a position of use;

shaft cam means mounted in fixed relation on said shaft and cam abutting means on said carrier means for transmitting the bias of said power spring through said carrier means and cam means to said shaft when said pawl means is not in engagement with said ratchet means; and a lower tension spring connected between said carrier means and cam means for biasing said shaft in a belt rewind direction in a low tension mode when said carrier means is held against rotation.

9. The dual tension retractor mechanism of claim 8 comprising:

a second idler cam member positioned for rotation about the axis of said shaft for engaging said pawl means and interposed between said pawl carrier means and said shaft cam means to provide an additional full rotation for said shaft in the belt rewinding direction during the low tension mode before said shaft cam means moves said idler cam member into engagement with said pawl means to causes release of said pawl means from said ratchet means.

* * * * *